United States Patent
Menon et al.

(10) Patent No.: US 12,137,045 B2
(45) Date of Patent: Nov. 5, 2024

(54) METRIC-BASED MULTI-HOP PATH SELECTION

(71) Applicant: Juniper Networks, Inc., Sunnyvale, CA (US)

(72) Inventors: Abilash Menon, Boxborough, MA (US); Markus Jork, Andover, MA (US); John M. Peterson, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 331 days.

(21) Appl. No.: 17/449,618

(22) Filed: Sep. 30, 2021

(65) Prior Publication Data

US 2022/0021600 A1 Jan. 20, 2022

Related U.S. Application Data

(63) Continuation-in-part of application No. 17/245,898, filed on Apr. 30, 2021, now Pat. No. 11,784,907, and
(Continued)

(51) Int. Cl.
*H04L 12/28* (2006.01)
*H04L 45/02* (2022.01)

(52) U.S. Cl.
CPC ............ *H04L 45/02* (2013.01); *H04L 45/04* (2013.01)

(58) Field of Classification Search
CPC ..... H04L 41/5019; H04L 67/51; H04L 45/02; H04L 45/04; H04L 41/5009; H04L 45/0377; H04L 43/08
See application file for complete search history.

(56) References Cited

U.S. PATENT DOCUMENTS

| 5,898,826 A | 4/1999 | Pierce et al. |
| 6,108,710 A | 8/2000 | Brabson et al. |

(Continued)

FOREIGN PATENT DOCUMENTS

| CN | 1663217 A | 8/2005 |
| CN | 1726679 A | 1/2006 |

(Continued)

OTHER PUBLICATIONS

"Transmission Control Protocol," Darpa Internet Program Protocol Specification, Information Sciences Institute, RFC 793, Sep. 1981, 91 pp.
(Continued)

*Primary Examiner* — Brian D Nguyen
(74) *Attorney, Agent, or Firm* — Shumaker & Sieffert, P.A.

(57) ABSTRACT

Techniques are described for a router providing metric-based multi-hop path selection. For example, a first router of a plurality of routers receives a plurality of network performance metrics for a plurality of links interconnecting the plurality of routers. The plurality of links form a plurality of multi-hop paths through the plurality of routers to a service instance. The router determines, based on the plurality of network performance metrics for the plurality of links, an end-to-end performance of each of the plurality of multi-hop paths. The router selects a multi-hop path over which to forward traffic associated with the session based on the end-to-end performance of each of the plurality of multi-hop paths and one or more performance requirements for a service associated between a session between a client device and the service instance. The router forwards the traffic to the service instance along the selected multi-hop path.

20 Claims, 5 Drawing Sheets

Related U.S. Application Data a continuation-in-part of application No. 16/410,131, filed on May 13, 2019, now Pat. No. 11,329,912, said application No. 17/245,898 is a continuation of application No. 16/410,121, filed on May 13, 2019, now Pat. No. 10,999,182, and a continuation-in-part of application No. 16/410,122, filed on May 13, 2019, now Pat. No. 11,451,464, and a continuation-in-part of application No. 16/410,100, filed on May 13, 2019, now Pat. No. 11,153,202.

(56) References Cited

U.S. PATENT DOCUMENTS

| | | |
|---|---|---|
| 6,507,577 B1 | 1/2003 | Mauger et al. |
| 6,563,835 B1 | 5/2003 | Chen |
| 6,587,438 B1 | 7/2003 | Brendel |
| 6,982,966 B2 | 1/2006 | Eidenschink et al. |
| 7,209,978 B2 | 4/2007 | Thubert et al. |
| 7,430,174 B2 | 9/2008 | Janneteau et al. |
| 7,720,054 B2 | 5/2010 | Savage et al. |
| 8,259,569 B2 | 9/2012 | Banerjee et al. |
| 8,665,874 B2 | 3/2014 | Czaszar et al. |
| 9,166,908 B2 | 10/2015 | Vasseur |
| 9,729,414 B1 | 8/2017 | Oliveira et al. |
| 9,729,439 B2 | 8/2017 | MeLampy et al. |
| 9,729,682 B2 | 8/2017 | Kumar et al. |
| 9,762,485 B2 | 9/2017 | Kaplan et al. |
| 9,871,748 B2 | 1/2018 | Gosselin et al. |
| 9,985,883 B2 | 5/2018 | MeLampy et al. |
| 10,063,464 B2 | 8/2018 | Ashwood-Smith |
| 10,200,264 B2 | 2/2019 | Menon et al. |
| 10,277,506 B2 | 4/2019 | Timmons et al. |
| 10,432,522 B2 | 10/2019 | Kaplan et al. |
| 10,613,962 B1 | 4/2020 | Delange |
| 10,834,265 B1 | 11/2020 | Antunes et al. |
| 10,990,891 B1 | 4/2021 | Atay |
| 10,999,182 B2 | 5/2021 | Kaplan et al. |
| 11,075,824 B2 | 7/2021 | McCulley et al. |
| 11,093,518 B1 | 8/2021 | Lu et al. |
| 11,153,202 B2 | 10/2021 | Kaplan et al. |
| 11,165,863 B1 | 11/2021 | Timmons et al. |
| 11,323,327 B1 | 5/2022 | Chitalia et al. |
| 2005/0054346 A1 | 3/2005 | Windham et al. |
| 2005/0114656 A1 | 5/2005 | Liu et al. |
| 2006/0030835 A1 | 2/2006 | Sherman et al. |
| 2006/0062214 A1 | 3/2006 | Ng et al. |
| 2007/0008949 A1 | 1/2007 | Balandin |
| 2007/0058638 A1 | 3/2007 | Guichard et al. |
| 2007/0177511 A1 | 8/2007 | Das et al. |
| 2007/0270779 A1 | 11/2007 | Jacobs et al. |
| 2008/0025218 A1 | 1/2008 | Liu |
| 2008/0062891 A1 | 3/2008 | Van der Merwe et al. |
| 2008/0080436 A1 | 4/2008 | Sandhu |
| 2008/0170570 A1 | 7/2008 | Moskaluk et al. |
| 2009/0097418 A1 | 4/2009 | Castillo et al. |
| 2009/0116404 A1 | 5/2009 | Mahop et al. |
| 2010/0043067 A1 | 2/2010 | Varadhan et al. |
| 2011/0019669 A1* | 1/2011 | Ma .......................... H04L 45/74 370/389 |
| 2011/0032844 A1 | 2/2011 | Patel et al. |
| 2011/0264822 A1 | 10/2011 | Ferguson |
| 2012/0069740 A1 | 3/2012 | Lu et al. |
| 2012/0144066 A1 | 6/2012 | Medved et al. |
| 2012/0281520 A1 | 11/2012 | Ansari et al. |
| 2013/0060933 A1 | 3/2013 | Tung et al. |
| 2013/0089093 A1 | 4/2013 | Bacthu et al. |
| 2013/0191688 A1 | 7/2013 | Agarwal et al. |
| 2013/0219035 A1 | 8/2013 | Detienne et al. |
| 2013/0301646 A1 | 11/2013 | Bogdanski et al. |
| 2014/0010117 A1 | 1/2014 | Lindem, III et al. |
| 2014/0129735 A1 | 5/2014 | Thyni et al. |
| 2014/0280919 A1 | 9/2014 | Lakes et al. |
| 2014/0355415 A1 | 12/2014 | Mandal et al. |
| 2015/0029837 A1 | 1/2015 | Ashwood-Smith |
| 2015/0127733 A1 | 5/2015 | Ding |
| 2015/0180771 A1 | 6/2015 | Ashwood-Smith |
| 2015/0248461 A1* | 9/2015 | Theeten ............ G06F 16/24524 707/718 |
| 2015/0381515 A1 | 12/2015 | Mattson et al. |
| 2016/0191325 A1 | 6/2016 | Pacella et al. |
| 2016/0211990 A1 | 7/2016 | Yue |
| 2016/0321341 A1 | 11/2016 | Ramamurthi |
| 2016/0352631 A1 | 12/2016 | Medved et al. |
| 2016/0359728 A1 | 12/2016 | Ficara et al. |
| 2017/0048924 A1 | 2/2017 | Mate et al. |
| 2017/0187686 A1 | 6/2017 | Shaikh et al. |
| 2017/0250906 A1 | 8/2017 | Melampy et al. |
| 2017/0331694 A1 | 11/2017 | Crickett et al. |
| 2017/0346691 A1 | 11/2017 | Crickett et al. |
| 2018/0041555 A1 | 2/2018 | Manohar et al. |
| 2018/0062932 A1 | 3/2018 | Cohn et al. |
| 2018/0097720 A1 | 4/2018 | Jaffer et al. |
| 2018/0102965 A1 | 4/2018 | Hari et al. |
| 2018/0314706 A1 | 11/2018 | Sirton et al. |
| 2019/0020738 A1 | 1/2019 | Paul et al. |
| 2019/0028577 A1 | 1/2019 | D'Souza et al. |
| 2019/0104206 A1 | 4/2019 | Goel et al. |
| 2019/0109770 A1 | 4/2019 | Pugaczewski |
| 2019/0116053 A1 | 4/2019 | Allan |
| 2019/0132197 A1 | 5/2019 | Saxena |
| 2019/0205737 A1* | 7/2019 | Bleiweiss .............. G06N 3/044 |
| 2020/0036624 A1* | 1/2020 | Michael ................ H04L 45/123 |
| 2020/0106640 A1 | 4/2020 | Labonte et al. |
| 2020/0344150 A1* | 10/2020 | Vasseur .................. H04L 45/08 |
| 2020/0366589 A1 | 11/2020 | Kaplan et al. |
| 2020/0366590 A1 | 11/2020 | Kaplan et al. |
| 2020/0366598 A1 | 11/2020 | Kaplan et al. |
| 2020/0366599 A1 | 11/2020 | Kaplan et al. |
| 2020/0403890 A1 | 12/2020 | McCulley et al. |
| 2021/0006490 A1 | 1/2021 | Michael |
| 2021/0250273 A1 | 8/2021 | Kaplan et al. |
| 2021/0328889 A1 | 10/2021 | McCulley et al. |
| 2022/0006726 A1* | 1/2022 | Michael .................. H04L 45/24 |
| 2022/0021606 A1 | 1/2022 | Kaplan et al. |

FOREIGN PATENT DOCUMENTS

| | | |
|---|---|---|
| CN | 101065677 A | 10/2007 |
| CN | 101252488 A | 8/2008 |
| CN | 101267433 A | 9/2008 |
| CN | 101547114 A | 9/2009 |
| CN | 101714942 A | 5/2010 |
| CN | 102150148 A | 8/2011 |
| CN | 102210126 A | 10/2011 |
| CN | 103999510 A | 8/2014 |
| CN | 104168154 A | 11/2014 |
| CN | 104579964 B | 4/2015 |
| CN | 105379188 A | 3/2016 |
| CN | 107231567 A | 10/2017 |
| CN | 107710717 A | 2/2018 |
| CN | 107852364 A | 3/2018 |
| EP | 0884873 A3 | 10/2001 |
| EP | 1185041 A2 | 3/2002 |
| EP | 1741247 B1 | 4/2012 |
| EP | 3334105 A1 | 6/2018 |
| WO | 2009057005 A2 | 5/2009 |
| WO | 2017074839 A1 | 5/2017 |

OTHER PUBLICATIONS

No Author 128 Technology, "Session Smart™ Routing: How it Works," Technical Whitepaper, 15 pages (Mar. 2018).

No Author 128 Technology, Step Solution Note, 9 pages (Aug. 2017).

No Author Enhanced Interior Gateway Routing Protocol (EIGRP) Wide Metrics Whitepaper, Cisco, 14 pages (Feb. 2016).

No Author128 Technology, Application Classification Solution Note, 11 pages (Aug. 2017).

No Author128 Technology, Failsafe Delivery Whitepaper, 13 pages (Sep. 2017).

No Author128 Technology, Hypersegmentation Under the Hood Whitepaper, 9 pages (Aug. 2018).

(56) References Cited

OTHER PUBLICATIONS

No Author128 Technology, Multipoint Secure Vector Routing Whitepaper, 9 pages (Jun. 2017).
No Author128 Technology, Network Security with 128 Networking Platform Whitepaper, 12 pages (Sep. 2019).
No Author128 Technology, Quality of Service Whitepaper, 6 pages (Oct. 2019).
No Author128 Technology, Resiliency Whitepaper, 9 pages (Sep. 2017).
Atlas A., et al., "Performance Based Path Selection for Explicitly Routed Label Switched Paths (LSPs) Using TE Metric Extensions," 10 pages (May 2016).
Berners-Lee et al., "Uniform Resource Identifier (URI): Generic Syntax," Network Working Group; RFC 3986, Jan. 2005, 62 pp.
Bryan et al., "JavaScript Object Notation {JSON} Patch," Internet Engineering Task Force (IETF); RFC 6902, Apr. 2013, 19 pp.
Caria M., et al., "SDN Partitioning: A Centralized Control Plane for Distributed Routing Protocols," Preliminary Version I Preprint, 14 pages (Apr. 2016).
Cordero Ja, "Link-State Routing Optimization for Compound Autonomous Systems in the Internet," 77 pages (Sep. 2011).
Crawley E., et al., "A Framework for QoS-based Routing in the Internet," 37 pages (Aug. 1998).
Dierks et al., "The Transport Layer Security (TLS) Protocol Version 1.2," Network Working Group, RFC 5246, Aug. 2008, 105 pp.
Ferro G., "Response: Distributed? Centralized? Both ?—Cisco Blog on One PK and SDN," Blog Post, 7 pages (Jul. 2012).
Filsfils C., "Segmant Routing Architecture," Internet Engineering Task Force (IETF), 32 pages (Jul. 2018).
George W., et al., Time Warner Cable et al., "Autonomous System Migration Mechanisms and Their Effects on the BGP AS_PATH Attribute," 16 pages (Nov. 2015).
IP Performance Measurement (ippm) documents, 15 pages (retrieved from: https://datatracker.ietf.org/wg/ippm/documents) (Jun. 2020).
Postel, "User Datagram Protocol," RFC 768, Aug. 28, 1980, 3 pp.
Postel, "Internet Control Message Protocol—DARPA Internet Program Protocol Specification," RFC 792, Information Sciences Institute, Network Working Group, Sep. 1981, 21 pp.
Prosecution History from U.S. Appl. No. 16/410,100, dated May 12, 2020 through Jul. 2, 2021, 87 pp.
Prosecution History from U.S. Appl. No. 16/410,122, dated May 19, 2020 through Nov. 18, 2021, 111 pp.
Prosecution History from U.S. Appl. No. 16/410,131, dated Sep. 29, 2022 through Feb. 18, 2022, 100 pp.
Prosecution history of U.S. Appl. No. 16/410,121 dated Aug. 4, 2020 through Jan. 25, 2021, 21 pp.
Rekhter Y., et al., Chrysler Corp., et al., "Address Allocation for Private internets," 9 pages (Feb. 1996).
Rescorla, "The Transport Layer Security (TLS) Protocol Version 1.3," Internet Engineering Task Force (IETF), RFC 8446, Aug. 2018, 160 pp.
Sollins et al., "Functional Requirements for Uniform Resource Names," Network Working Group; RFC 1737, Dec. 1994, 7 pp.
U.S. Appl. No. 17/645,846, filed Dec. 23, 2021, naming inventors Menon et al.
Vissicchio S., et al., "Central Control over Distributed Routing," 14 pages (Aug. 2015).
Wijnands I.J., et al., Cisco Systems, et al., "PIM Flooding Mechanism (PFM) and Source Discovery (SD)," 18 pages (Mar. 2018).
Younis et al., "Constraint-Based Routing in the Internet: Basic Principles and Recent Research," IEEE Communications Surveys and Tutorials, vol. 5, Issue No. 1, Third Quarter, Jul. 2003, 15 pp.
Notice of Allowance from U.S. Appl. No. 17/245,898 dated Jun. 13, 2023, 5 pp.
Supplemental Notice of Allowance from U.S. Appl. No. 17/657,389 dated Jun. 20, 2023, 2 pp.
Corrected Notice of Allowance from U.S. Appl. No. 16/410,122 dated Jun. 29, 2022, 2 pp.
Extended Search Report from counterpart European Application No. 22151630.5 dated Jun. 13, 2022, 11 pp.
Katz et al., "Bidirectional Forwarding Detection (BFD)", Internet Engineering Task Force (IETF) RFC 5880, Jun. 1, 2010, 49 pp.
Michael et al., "Optimal link-state 1 hop-by-hop routing", 2013 21st IEEE International Conference on Network Protocols (ICNP), IEEE, Oct. 7, 2013, 10 pp.
Response to Office Action dated Oct. 5, 2022 from U.S. Appl. No. 17/657,389, filed Jan. 4, 2023, 12 pp.
Response to Office Action dated Nov. 25, 2022 from U.S. Appl. No. 17/245,898, filed Jan. 26, 2023, 10 pp.
Final Office Action from U.S. Appl. No. 16/410,122, dated Mar. 7, 2022, 16 pp.
Notice of Allowance from U.S. Appl. No. 16/410,122, dated May 24, 2022, 6 pp.
Response to Final Office Action dated Mar. 7, 2022, from U.S. Appl. No. 16/410,122, filed May 9, 2022, 11 pp.
U.S. Appl. No. 17/657,389, filed Mar. 31, 2022, naming inventors Kaplan et al.
Kumar et al., "Multicasting in Wireless Mesh Networks: Challenges and Opportunities", 2009 International Conference on Information Management and Engineering, IEEE, Apr. 3, 2009, pp. 514-518.
Notice of Allowance from U.S. Appl. No. 17/657,389 dated Apr. 19, 2023, 7 pp.
Office Action from U.S. Appl. No. 17/449,609 dated May 11, 2023, 33 pp.
Supplemental Notice of Allowance from U.S. Appl. No. 17/657,389 dated May 4, 2023, 4 pp.
Xu et al., "OSPF server based network topology discovery", vol. 24, No. 8, China Academic Journal Electronic Publishing House, Feb. 16, 2004, pp. 98-100, Translation provided for only the Abstract.
Response to Extended Search Report dated Nov. 7, 2022, from counterpart European Application No. 20805130.0 filed May 23, 2023, 14 pp.
Anonymous, "Step Solution Note", 128 Technology, Aug. 2017, 9 pp., Retrieved from the Internet on Jan. 4, 2021 from URL: https://www.128technology.com/wpcontent/uploads/2017/09/whitepaper_step_sept2017.pdf.
Corrected Notice of Allowance from U.S. Appl. No. 16/410,122 dated Aug. 17, 2022, 2 pp.
Huang et al., "Network Topology Service (NTS) Framework", draft-huang-alto-nts-framework-00; Internet-Draft, Mar. 2015, 9 pp.
Office Action from U.S. Appl. No. 17/245,898 dated Nov. 25, 2022.
Office Action from U.S. Appl. No. 17/657,389 dated Oct. 5, 2022, 22 pp.
Penno et al., "ALTO and Content Delivery Networks", Internet-Draft, Network Working Group, Mar. 2011, pp. 1-27.
Wang et al., "A Yang Data Model for Protocol Independent Service Topology: SFF Forwarder", draft-wang-i2rs-yang-sff-dm-00; I2RS Internet-Draft, Mar. 2015, 21 pp.
Notice of Allowance from U.S. Appl. No. 17/245,898 dated Feb. 15, 2023, 5 pp.
Notice of Allowance from U.S. Appl. No. 17/245,898 dated Aug. 17, 2023, 2 pp.
Notice of Allowance from U.S. Appl. No. 17/657,389 dated Jul. 27, 2023, 2 pp.
Office Action from U.S. Appl. No. 17/645,846 dated Aug. 17, 2023, 15 pp.
Response to Office Action dated May 11, 2023 from U.S. Appl. No. 17/449,609, filed Aug. 11, 2023, 11 pp.
Response to Extended Search Report dated Jun. 13, 2022, from counterpart European Application No. 22151630.5 filed Oct. 4, 2023, 18 pp.
Communication pursuant to Article 94(3) EPC from counterpart European Application No. 22151630.5 dated Feb. 1, 2024, 6 pp.
Notice of Allowance from U.S. Appl. No. 17/449,609 dated Nov. 22, 2023, 15 pp.
Response to Office Action dated Aug. 17, 2023 from U.S. Appl. No. 17/645,846, filed Nov. 17, 2023, 14 pp.
Notice of Allowance from U.S. Appl. No. 17/645,846 dated Dec. 28, 2023, 9 pp.
Response to Communication pursuant to Article 94(3) EPC dated Feb. 1, 2024, from counterpart European Application No. 22151630.5 filed May 31, 2024, 5 pp.

(56) References Cited

OTHER PUBLICATIONS

Communication pursuant to Article 94(3) EPC from counterpart European Application No. 22151630.5 dated Jul. 30, 2024, 5 pp.
Notice of Allowance from U.S. Appl. No. 18/475,790 dated Aug. 27, 2024, 5 pp.

* cited by examiner

METRIC-BASED MULTI-HOP PATH SELECTION

This application is a continuation-in-part of U.S. patent application Ser. No. 16/410,122, which was filed May 13, 2019 and which issued as U.S. Pat. No. 11,451,464 on Sep. 20, 2022; U.S. patent application Ser. No. 16/410,131, which was filed May 13, 2019 and which issued as U.S. Pat. No. 11,329,912 on May 10, 2022; U.S. patent application Ser. No. 16/410,100, which was filed May 13, 2019 and which issued as U.S. Pat. No. 11,153,202 on Oct. 19, 2021; and U.S. patent application Ser. No. 17/245,898, which was filed on Apr. 30, 2021 and which issued as U.S. Pat. No. 11,784,907 on Oct. 10, 2023, and which is a continuation of U.S. patent application Ser. No. 16/410,121, which was filed May 13, 2019 and which issued as U.S. Pat. No. 10,999,182 on May 4, 2021; the entire contents of each of which is incorporated herein by reference.

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

In general, the disclosure describes techniques for metric-based multi-hop path selection. A client device may originate a session between the client device and a service instance hosted by a server, for example. Traffic for the session may be forwarded along a forward path and a reverse path between the client device and the service instance. The forward path (and/or reverse path) may, in some instances, be formed by a plurality of links through a plurality of routers to the service instance, referred to as a "multi-hop" path.

Typically, network traffic associated with a service may be forwarded over a multi-hop path, wherein one or more routers perform a local, independent decision to select a next-hop router to which to forward the network traffic. For example, each of the routers may measure network performance metrics of its local links (e.g., an immediate link to an adjacent router) and determine a path (e.g., by using path computation algorithms such as shortest path first (SPF)) to forward traffic based on the network performance metrics of its local links. However, these routers are unable to perform path selection based on a global view of the performance of a multi-hop path based on granular performance metrics of each link of the multi-hop path.

In accordance with the techniques described in this disclosure, a router, such as a source router or an edge router, receives one or more network performance metrics for each link of the plurality of links of a multi-hop path and determines, based on the network performance metrics of each link of the multi-hop path, a path over which to forward traffic to a service instance. For example, each of a plurality of routers of a multi-hop path measures one or more network performance metrics of its immediate links to adjacent routers and/or endpoints (e.g., client devices). The one or more network performance metrics may include, e.g., latency, bandwidth, jitter, packet loss, etc. In some examples, each router uses a measurement protocol or other mechanism to measure the one or more network performance metrics of the immediate links to adjacent routers. The routers may each send the measured one or more network performance metrics, for example, to a central repository (e.g., a server) that stores the measured one or more network performance metrics and other information, such as service and topology state information for each of the plurality of routers. A router, e.g., a source router or an edge router, may receive the network performance metrics for the plurality of links that form one or more multi-hop paths between two client devices (e.g., a client device and a server hosting a service instance) and determine an end-to-end performance of each of the multi-hop paths. In some examples, the router computes a path performance metric (e.g., latency, bandwidth, jitter, packet loss, cost, etc.) of a multi-hop path from the network performance metrics of each link that form the multi-hop path. In some examples, the router may determine from the network performance metrics of links that form the multi-hop path whether a particular link of the multi-hop path that is not adjacent to the router has failed.

Based on the end-to-end performance of the multi-hop paths, the router may select a path over which to forward traffic for the service instance. For example, the router may compare the path performance metric for the multi-hop path with performance requirements (e.g., requirements defined by a Service Level Agreement (SLA) to determine whether the multi-hop path complies with the SLA. Additionally, in the instance that a plurality of multi-hop paths comply with the SLA, the router determines which of the paths is most suitable for forwarding traffic associated with the service, and forwards the traffic along the selected path. For example, the router may determine which of the paths has a best end-to-end performance (e.g., lowest latency or lowest Mean Opinion Score), and forwards traffic for the service on the path with the best performance. As another example, the router may determine which of the paths provides minimum viable performance while still complying with the SLA (e.g., least satisfies the SLA), and forward traffic for the service along the path providing minimum viable performance.

The techniques of the disclosure may provide specific improvements to the computer-related field of computer networking and path selection that have practical applications. For example, by providing a router with network performance metrics of each link that form a multi-hop path, the router receives more granular network performance metric information for each link of multi-hop paths, and thus, may determine the best path to forward traffic to the service instance based on a global view of the performance of the multi-hop path. Furthermore, the techniques of the disclosure may enable a router to use such granular network performance metric information to determine that the network performance of a multi-hop path fails to satisfy SLA requirements for a session between two client devices, even where the network performance of each link forming the multi-hop path individually satisfies the SLA requirements for the session. For example, at the time of establishment of a session between two devices, a router may select a path over which to forward traffic for the session, using the techniques disclosed herein to ensure that the selected path satisfies SLA requirements for the session. Additionally, the techniques of the disclosure may enable a router to perform service-specific path switchover or failover from a first multi-hop path for a particular service that is underperforming (or failed) to a second multi-hop path with a more suitable performance, without adversely affecting other services that may continue to use the first multi-hop path.

In one example, this disclosure describes a method comprising: receiving, by a first router of a plurality of routers and from a server, metrics of individual links forming a plurality of paths associated with a service, wherein the server is configured to store the metrics of individual links, the metrics of individual links received from each router of the plurality of routers; selecting, by the first router and based on the metrics of the individual links forming the plurality of paths associated with the service, a path of the plurality of paths associated with the service; and in response to selecting the path of the plurality of paths associated with the service, forwarding, by the first router, network traffic associated with a session between a source client device and a destination client device providing the service on the selected path, wherein the network traffic includes at least one packet that is modified to include metadata specifying addressing information for the source client device and the destination client device.

In another example, this disclosure describes a method comprising: receiving, by a first router of a plurality of routers of a network connecting a client device to a service instance, a plurality of network performance metrics for a plurality of links interconnecting the plurality of routers, wherein the plurality of links form a plurality of multi-hop paths from the first router through the plurality of routers to the service instance; determining, by the first router and based on the plurality of network performance metrics, an end-to-end performance of each of the plurality of multi-hop paths; selecting, by the first router and based on the end-to-end performance of each of the plurality of multi-hop paths and one or more performance requirements for a service associated with a session between the client device and the service instance, a multi-hop path over which to forward traffic associated with the session; and forwarding, by the first router, the traffic associated with the session to the service instance along the selected multi-hop path.

In another example, this disclosure describes a first router of a plurality of routers of a network connecting a client device to a service instance, the first router comprising: processing circuitry; and a memory operably coupled to the processing circuitry and comprising instructions configured to cause the processing circuitry to: receive a plurality of network performance metrics for a plurality of links interconnecting the plurality of routers, wherein the plurality of links form a plurality of multi-hop paths from the first router through the plurality of routers to the service instance; determine, based on the plurality of network performance metrics, an end-to-end performance of each of the plurality of multi-hop paths; select, based on the end-to-end performance of each of the plurality of multi-hop paths and one or more performance requirements for a service associated with a session between the client device and the service instance, a multi-hop path over which to forward traffic associated with the session; and forward the traffic associated with the session to the service instance along the selected multi-hop path.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
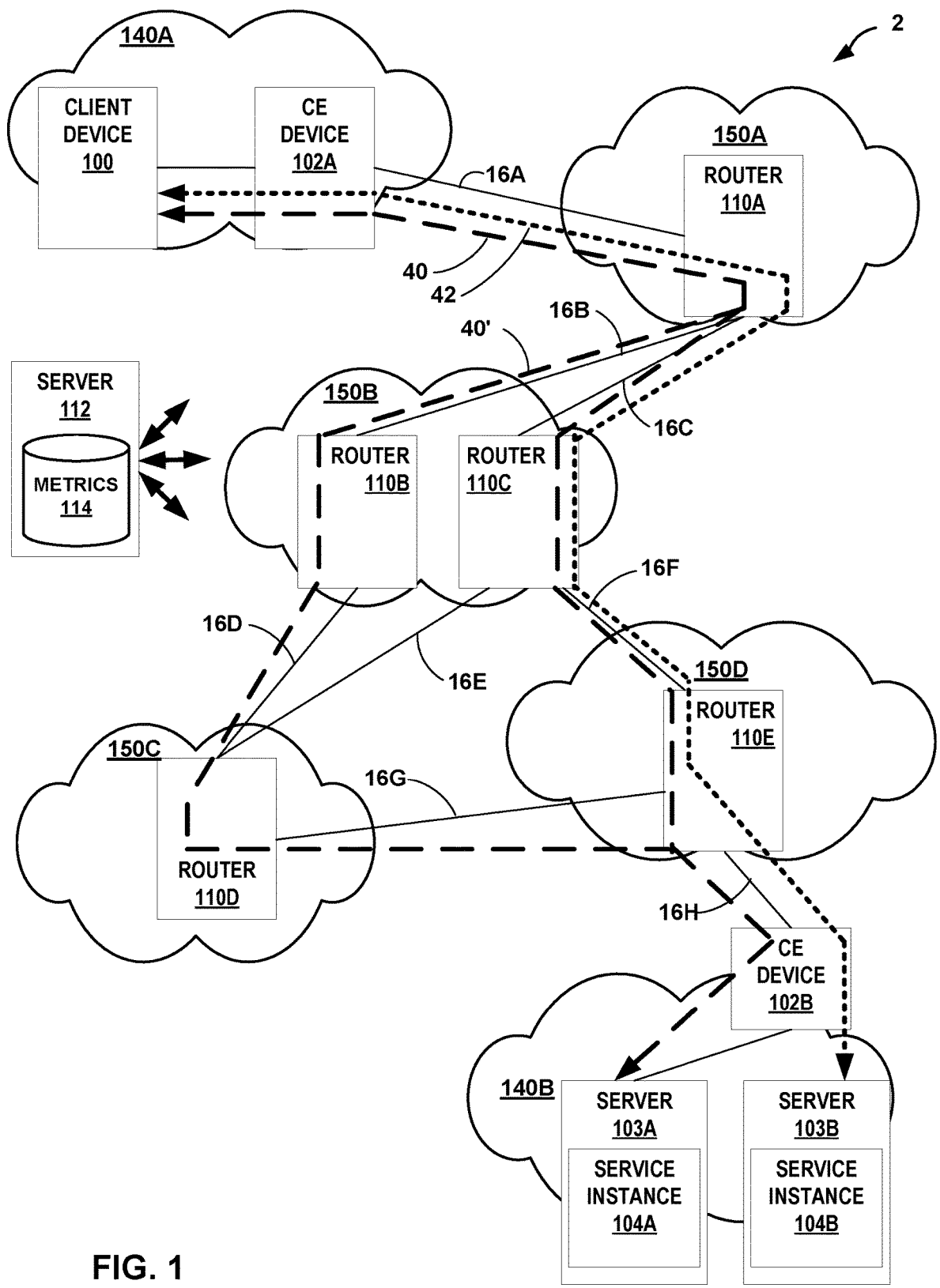
FIG. 1 is a block diagram illustrating an example computer network system in accordance with the techniques of the disclosure.

FIG. 1 is a block diagram illustrating example computer network system 2 in accordance with the techniques of the disclosure. In the example of FIG. 1, computer network system 2 includes service provider networks 150A-150D (collectively, "service provider networks 150") configured to provide Wide Area Network (WAN) connectivity to disparate customer networks 140A-140B ("customer networks 140"). Routers 110A-110E (collectively, "routers 110") of service provider networks 150 provide client device 100 and servers 103A, 103B (collectively, "servers 103") associated with customer networks 140 with access to service provider networks 150 via customer edge devices 102A-102B (collectively, "CE devices 102").

In some examples, customer networks 140 may be networks for geographically separated sites of an enterprise. In some examples, customer network 140A may represent an enterprise network and customer network 140B may represent a cloud service provider (CSP) network that provides a network service to client device 100 in the form of service instances 104A and 104B hosted by servers 103A and 103B, respectively. Each of customer networks 140 may include additional customer equipment, such as, one or more nonedge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1.

CE devices 102 and routers 110 are illustrated as routers in the example of FIG. 1. However, techniques of the disclosure may be implemented using any network device, such as routers, switches, gateways, or other suitable network devices that may send and receive network traffic. CE devices 102 and/or routers 110 may be connected by communication links 16A-16H (collectively, links "16"), such as Ethernet, ATM or any other suitable network connections.

Service provider networks 150 represent one or more publicly accessible computer networks that are owned and operated by one or more service providers. Although computer network system 2 is illustrated in the example of FIG. 1 as including multiple interconnected service provider networks 150, in other examples, computer network system 2 may alternatively include a single service provider network that provides connectivity between customer networks 140. A service provider is usually a large telecommunications entity or corporation. Each of service provider networks 150 is usually a Layer-Three (L3) computer network, where reference to a layer followed by a number refers to a corresponding layer in the Open Systems Interconnection (OSI) model. Each service provider network 150 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100 and servers 103, with access to the Internet, and may allow the computing devices within customer networks 140 to communicate with each other.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

The configuration of computer network system 2 illustrated in FIG. 1 is merely an example. For example, computer network system 2 may include any number of customer networks and the customer networks may each include any number of client devices. Although additional routers are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Session-Based Routing

In some examples, routers 110 may implement a stateful, session-based routing scheme that enables each router 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation of tunnel headers at tunnel endpoints. Routers 110 may, for example, implement session-based routing as Secure Vector Routing (SVR), provided by Juniper Networks, Inc.

In the example of FIG. 1, client device 100 of system 2 establishes service-specific sessions, e.g., sessions 40 and 42, with service instances 104A and 104B, respectively. Routers 110 facilitate establishment of sessions 40, 42 by transporting network traffic between client device 100 and service instances 104. In some examples, client device 100 may be considered a "source" device in that client device 100 originates sessions 40, 42 between client device 100 and service instances 104 (e.g., client device 100 is the "source" of the first packet of the forward flow of the session). For a first service, e.g., service instance 104A, session 40 includes a forward packet flow originating from client device 100 and destined for service instance 104A hosted by server 103A, and a reverse packet flow originating from service instance 104A and destined for client device 100. A forward flow for session 40 to reach service instance 104A traverses a first path including, e.g., client device 100, CE device 102A, router 110A, router 110C, router 110E, CE device 102B, and server 103A. For a second service, e.g., service instance 104B, session 42 includes a forward packet flow originating from client device 100 and destined for service instance 104B hosted by server 103B, and a reverse packet flow originating from service instance 104B and destined for client device 100. In this example, forward flows for session 40 and session 42 to reach service instances 104 traverse similar paths including, e.g., router 110A, router 110C, and router 110E.

Client device 100 may establish sessions 40, 42 according to one or more communication session protocols including TCP, TLS, UDP, or ICMP, etc. For example, to establish session 40 according to TCP such that data may be exchanged according to TCP, client device 100 and service 103A perform a three-way handshake. Client device 100 sends a first packet comprising a "SYN" flag to server 103A. Server 103A acknowledges receipt of the first packet by responding to client device 100 with a second packet comprising a "SYN-ACK" flag. Client device 100 acknowledges receipt of the second packet by responding to service instance 104 with a third packet comprising an "ACK" flag. After sending the third packet, session 40 is established according to TCP and client device 100 and server 103A may exchange data with one another via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference. Additional example information regarding TLS is described in "The Transport Layer Security (TLS) Protocol Version 1.2," RFC 5246, IETF, August 2008, available at https://tools.ietf.org/html/rfc5246; and "The Transport Layer Security (TLS) Protocol Version 1.3," RFC 8446, IETF, August 2018, available at https://tools.ietf.org/html/rfc8446, the entire contents of each of which are incorporated herein by reference. Additional example information regarding UDP is described in "User Datagram Protocol," RFC 768, IETF, Aug. 28, 1980, available at https://tools.ietf.org/html/rfc768, the entire contents of which are incorporated herein by reference. Additional example information regarding ICMP is described in "INTERNET CONTROL MESSAGE PROTOCOL," RFC 792, IETF, September 1981, available at https://tools.ietf.org/html/rfc792, the entire contents of which are incorporated herein by reference.

In the example of FIG. 1, when router 110A receives a packet for the forward packet flow originating from client device 100 and destined for server 103A, router 110A determines whether the packet belongs to a new session (e.g., is the "first" packet or "lead" packet of session 40) or an existing session. For example, router 110A determines whether a source address, source port, destination address, destination port, and protocol of the packet matches locally stored session information (e.g., an entry in a session table).

If no such entry exists, router 110A determines that the packet belongs to a new session 40 and stores information identifying session 40 (e.g., creates an entry in the session table). Furthermore, if the packet belongs to a new session 40, router 110A generates a session identifier for session 40. In this example, the session identifier for session 40 may comprise, for example, a source address and source port of client device 100, a destination address and destination port of server 103A, and/or a protocol included in the first packet. Router 110A may use the session identifier to identify whether subsequent packets belong to session 40.

In some examples, routers 110 perform stateful routing for session 40. For example, routers 110 forward each packet of the forward packet flow of session 40 sequentially and along the same forward network path. As described herein, the "same" forward path may represent the same routers 110 that form a segment or at least a portion between a device originating the packet and a device to which the packet is destined (and not necessarily the entire network path between the device originating the packet and the device to which the packet is destined). Further, routers 110 forward each packet of the return flow of session 40 sequentially and along the same return network path. The forward network path for the forward packet flow of session 40 and the return network path of the return flow of session 40 may be the same path, or different paths. Each of routers 110 along the path may maintain the state of the entire packet flow for packets that are forwarded sequentially and along the same path, thereby enabling the use of stateful packet services, such as Deep Packet Inspection (DPI).

In the example of FIG. 1, a stateful routing session for session 40 may be established from ingress router 110A, through one or more of intermediate routers 110B-110D, to egress router 110E. In this example, router 110A, in response to determining that a received packet is a first packet of new session 40 (e.g., unmodified packet) and storing the session information, modifies the first packet to include metadata specifying the session identifier (e.g., the original source address, source port, destination address, and destination port) to signal information about session 40 to other routers 110. In some examples, the metadata may be specified within a Type-Length-Value (TLV) field of the first packet. Router 110A may also modify the header of the first packet, e.g., by replacing the header of the first packet to specify a source address of router 110A, a source port in which router 110A forwards the modified first packet toward server 103, a destination address of the next hop to which router 110A forwards the first packet (e.g., an address of router 110C), and a destination port of the next hop to which router 110A forwards the first packet (e.g., a port of router 110C).

Router 110A may further identify a network service associated with session 40. For example, router 110A may compare one or more of a source address, source port, destination address, or destination port for the session to service address and port information (e.g., stored in a service table of router 110A) to identify a service associated with session 40. Examples of network services include Hypertext Transfer Protocol (HTTP), a firewall service, a proxy service, packet monitoring or metrics services, network transport services (e.g., real-time transport protocol (RTP), web services, etc. In this example, router 110A may determine that the forward packet flow of session 40 specifies a destination address and destination port assigned to service instance 104A of server 103A. Router 110A may thereafter store an association between session 40 and session instance 104A. In some examples, router 110A may determine that one or more of a source address, source port, destination address, or destination port for session 40 belong to a block of addresses or ports indicative that a particular service is associated with session 40.

In some examples, router 110A uses the determined network service for session 40 to select a forward path for forwarding the first packet and each subsequent packet of the forward packet flow of session 40 toward server 103A. In this fashion, router 110A may perform service-specific path selection to select a network path that best suits the requirements of the service. In contrast to a network topology that uses an SDN controller to perform path selection, each router 110 performs path selection. Further, the use of session-based routing enables each router 110 to make routing decisions at the service- or application-level, in contrast to conventional routers that are only able to make routing decisions at the flow level.

Router 110A forwards the modified first packet to the next hop on the forward path, e.g., router 110C. Intermediate router 110C receives the modified first packet and determines whether the modified first packet includes metadata specifying a session identifier. In response to determining that the modified first packet includes metadata specifying a session identifier for session 40, intermediate router 110C determines that router 110C is not an ingress routing device for session 40 such that router 110C does not attach additional metadata to the packet.

As described above with respect to router 110A, router 110C similarly determines whether an incoming packet belongs to a new session or an existing session, for example, by determining whether a source address, source port, destination address, destination port, and protocol of the modified first packet received from router 110A matches locally stored session information (e.g., matches an entry in a session table). If no such entry exists, router 110C determines that the packet belongs to a new session 40 and stores information identifying session 40 (e.g., creating an entry in the session table). Furthermore, if the packet belongs to a new session 40, router 110C generates a session identifier for session 40. The session identifier used by router 110C to identify session 40 for the first packet may, in some examples, be different from the session identifier used by router 110A to identify session 40 for the first packet, because each of routers 110A and 110C uses header information (e.g., source address, source port, destination address, and destination port) of the first packet to generate the session identifier, and this header information may be modified by each preceding router 110 as each router 110 forwards the first packet along the forward path. Furthermore, each router 110 may store this header information to identify a previous router 110 (or "waypoint") and a next router 110 (or "waypoint") such that each router 110 may reconstruct the same forward path and reverse path for each subsequent packet of the session.

Router 110C replaces the header of the modified first packet to specify a source address of router 110C, a source port in which router 110C forwards the modified first packet toward server 103A, a destination address of the next hop to which router 110C forwards the first packet (e.g., an address of router 110D for session 40 along the first path), and a destination port of the next hop to which router 110C forwards the first packet (e.g., a port of router 110D). Router 110C forwards the modified first packet to the next hop on the forward path, e.g., router 110D. If there are any additional subsequent immediate routers along the path, the subsequent intermediate routers may similarly process the modified first packet as routers 110A and 110C such that routers 110 are configured with the session information to forward the subsequent packets of session 40 along the same path as the first packet.

A router 110 that may forward packets for a forward packet flow of the session to a destination for the packet flow is an egress, or "terminus" router. In the foregoing example, router 110E is a terminus router because router 110E may forward packets of session 40 to CE device 102B for forwarding to server 103A. Router 110E receives the modified first packet from a preceding router that comprises the metadata specifying the session identifier (e.g., the original source address, source port, destination address, and destination port) for session 40. Router 110E identifies the modified first packet as destined for a service terminating at router 110E by determining that the destination source address and destination source port specified in the metadata of the modified first packet corresponds to a destination reachable by router 110E (e.g., server 103A via CE device 102B). Router 110E recovers the original header information of the first packet by removing the metadata from the modified first packet and using the metadata to modify the header of the first packet to specify the original source address, source port, destination address, and destination port as specified in the metadata. Router 110E then forwards the recovered first packet to CE device 102B for forwarding to server 103A. The use of session-based routing may therefore form a series of waypoints (e.g., routers 110) interconnected by path "segments" (e.g., end-to-end route vectors between each waypoint).

Although the example above is described with respect to routers 110 performing stateful routing for session 40, routers 110 may similarly perform stateful routing for any service-specific sessions, such as session 42 established between client device 100 and service instance 104B.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

Exchanging Service and Topology State Information

In some examples, to implement session-based routing, each router 110 maintains a local repository of service and topology state information for each other router 110. The service and topology state information includes services reachable from each router 110, as well as a network topology from each router for reaching these services. Each router 110 may send service reachability information (and any changes to the reachability of services) through the router 110 and/or the network topology (and any changes to the network topology) for reaching the services to a central repository, e.g., server 112. For example, each router 110 may send a JavaScript Object Notation (JSON) document including service and topology state information to server 112. Further, each router 110 may receive service and topology state information (e.g., a via a JSON document) for each other router 110 in system 2 from server 112. In this way, each of routers 110 may "publish" service and topology state information of the router, and each router 110 may "subscribe" to receive the service and topology state information of other routers 110.

Routers 110 may each use the service and topology state information for each router 110 to select the network path for forwarding the packet. For example, router 110A may use the identified service associated with the packet and a network topology for reaching the identified service to select a network path that comports with an SLA requirement or other session performance requirements for the service. Router 110A may then forward the packet and subsequent packets for the forward packet flow of session 40 (or session 42) along the selected path. In this way, router 110A may perform service-specific path selection in that router 110 may use criteria specific to the service associated with the packet to select a network path that best suits the requirements of the service.

In some examples, interfaces of routers 110 may be assigned to one or more "neighborhoods." A "neighborhood" is defined as a label applied to an interface of a router 110. The routers 110 within the same neighborhood are capable of forming a peering relationship with one another. For example, each router 110 having an interface to which a neighborhood label is applied is reachable over a Layer-3 network to each other router 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each router 110 maintains a local repository of service and topology state information only for those other routers 110 within the same neighborhood. In some examples, each router 110 maintains a local repository of service and topology state information only for those other routers 110 within the same district of neighborhoods. As an example, each service provider network 150 may be considered to be a different "district," wherein each subdomain within each service provider network 150 may be considered to be a neighborhood within that district. In this example, each router 110A and other routers within service provider network 150A may maintain service and topology state information only for one another, and not for routers 110B-110E. Similarly, each router 110B and 110C within service provider network 150B may maintain service and topology state information only for one another, and not for routers 110A or 110D-110F. In other examples, an administrator may assign one or more service provider networks 150 into one or more districts, one or more neighborhoods, or a combination of districts and neighborhoods as suits the needs of network system 2.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

Metric-Based Multi-Hop Path Selection.

Conventionally, each router of a plurality of routers may independently determine a next-hop router to which the router may forward traffic. In some examples, such a plurality of routers make may such a next-hop determination on a service-specific basis so as to select a different next-hop router that is most suitable for each different service associated with traffic forwarded by the router. For example, each router of a multi-hop path measures one or more network performance metrics of its immediate links to adjacent routers and/or to client devices, and independently makes a local selection of a path to forward traffic based on whether the one or more network performance metrics of its local links comply with SLA requirements and/or whether its local links are up or down. However, routers typically do not have a global view of the performance of a multi-hop path based on granular performance metrics of each link of the multi-hop path when selecting a path to forward traffic to a service instance. For example, a router may determine that a latency measurement of an immediate link to an adjacent router complies with an SLA requirement for latency, and so forwards traffic on the link despite an end-to-end latency of a multi-hop path including the link not complying with the SLA requirement for latency. In some examples, a router may only receive a status of non-immediate links (e.g., whether the link is up or down) or whether the individual link complies with the SLA requirement. In these examples, each of the links of the multi-hop path may individually comply with the SLA requirement, but the end-to-end performance of the multi-hop path does not comply with the SLA requirement.

In accordance with the techniques of the disclosure, a router, e.g., router 110A, may perform metric-based multi-hop path selection. In the example of FIG. 1, session 40 may be established between client device 100 and service instance 104A. In this example, session 40 comprises a forward flow originating from client device 100 and destined for service instance 104A and a reverse flow originating from service instance 104A and destined for client device 100. Session 40 may include a multi-hop path to service instance 104A traversing routers 110A, 110C, and 110E interconnected by links 16C and 16F, respectively. Similarly, session 42 may be established between client device 100 and service instance 104B. In this example, session 42 comprises a forward flow originating from client device 100 and destined for service instance 104B and a reverse flow originating from service instance 104B and destined for client device 100. Session 42 may include a multi-hop path to service instance 104B traversing routers 110A, 110C, and 110E interconnected by links 16C and 16F, respectively.

Each of routers 110 may implement one or more measurement protocols or mechanisms, such as One-Way Active Measurement Protocol (OWAMP), Two-Way Active Measurement Protocol (TWAMP), Internet Control Message Protocol (ICMP) echo, TCP/UDP ping, etc., to measure network performance metrics such as latency, jitter, packet loss, and/or other network performance metrics of immediate links to adjacent routers 110. In some examples, routers 110 may perform in-line performance monitoring. For example, router 110A may include a Type-Length-Value (TLV) field within the first packet that signals to a downstream router to respond with data (e.g., timestamp) for measuring one or more network performance metrics. For instance, router 110A may include a TLV field within the first packet of session 40 such that a receiving router, e.g., router 110C, returns a network performance metric to router 110A or pushes the data to server 112, which in turn may determine network performance metrics with the returned data. Additional examples describing in-line performance monitoring is described in U.S. Pat. No. 11,075,824, entitled "IN-LINE PERFORMANCE MONITORING," filed Jun. 19, 2019, and U.S. patent application Ser. No. 17/365,007, entitled "IN-LINE PERFORMANCE MONITORING," filed Jul. 1, 2021, the entire contents of each of which is incorporated by reference herein.

Each of routers 110 measures one or more network performance metrics of its immediate links to adjacent routers and/or endpoints (e.g., client devices or servers). In the example of FIG. 1, router 110A measures one or more network performance metrics of link 16B connecting router 110A to router 110B, and link 16C connecting router 110A to router 110C. Router 110B measures one or more network performance metrics of link 16B connecting router 110B to router 110A, and link 16D connecting router 110B to router 110D. Router 110C measures one or more network performance metrics of link 16C connecting router 110C to router 110A, link 16E connecting router 110C to router 110D, and link 16F connecting router 110C to router 110E. Router 110D measures one or more network performance metrics of link 16D connecting router 110D to router 110B, link 16E connecting router 110D to router 110C, and link 16F connecting router 110D to router 110E. Router 110E measures one or more network performance metrics of link 16F connecting router 110E to router 110C, and link 16G connecting router 110E to router 110D. In some examples, routers 110 may also measure one or more network performance metrics of its immediate links to client devices. For example, router 110A measures one or more network performance metrics of link 16A connecting router 110A to CE device 102A (or to client device 100). Router 110E measures one or more performance measurements of link 16H connecting router 110E to client device 102B (or to any of servers 103).

Each of routers 110 sends the measured network performance metrics to server 112 (e.g., specified in a JSON document), which stores the network performance metrics in a data store ("metrics 114"). In some examples, each of routers 110 sends the measured network performance metrics to other routers 110 directly. Routers 110 may receive metrics 114 of each link 16 measured by other routers 110. For example, router 110A receives one or more network performance metrics of non-immediate links 16D, 16E, 16F, and 16G for routers 110 not adjacent to router 110A. Based on the network performance metrics of each link 16, router 110A may determine an end-to-end performance of each multi-hop path through service provider networks 150 to a particular service instance, e.g., service instance 104A or service instance 104B.

As one example, router 110A receives latency measurements of link 16C and link 16F. Router 110A uses the latency measurements to compute a path latency for a first multi-hop path to reach service instance 104A traversing router 110A, router 110C, and router 110E. In some examples, router 110A computes the path latency of the first multi-hop path as a sum of each latency measurements of link 16C and link 16F. Router 110A may similarly receive a latency measurement of other links 16 that form other multi-hop paths to the service instance. For example, router 110A receives latency measurements of link 16B, link 16D, and link 16G, and computes a path latency for a second multi-hop path to reach service instance 104A traversing router 110A, router 110B, router 110D, and router 110E.

Alternatively, or additionally, router 110A may receive bandwidth measurements of links and compute a path bandwidth for each multi-hop path to reach service instance 104A. In some examples, router 110A computes the path bandwidth of the first multi-hop path as equal to the bandwidth measurement that is the lower of link 16C and link 16F. In some examples, router 110A computes the path bandwidth of the first multi-hop path as equal to the bandwidth measurement that is the greater of link 16C and link 16F. In some examples, router 110A computes the path bandwidth of the first multi-hop path as an average of the bandwidth measurements of link 16C and link 16F.

In additional examples, router 110A may receive other network performance measurements of links 16 and compute a path performance metric for a multi-hop path. For example, router 110A may receive measurements of jitter, packet loss, etc. for each link 16, and compute a path jitter or path packet loss for the multi-hop path formed by the links 16. Alternatively, or additionally, router 110A may receive an indication of an individual link failure of a plurality of links that form a multi-hop path to service instance 104A. In some examples, router 110A may compute a mean opinion score (MOS) (e.g., rating value indicating a particular quality ranging from excellent, good, fair, poor, and bad) based on the network performance metrics of each link 16 of a multi-hop path.

In some examples, router 110A receives a plurality of network performance measurements for each link 16, such as a measurement of a jitter, a packet loss, a bandwidth, and a latency for each link 16. Router 110A may compute a cost for each link 16 by weighting each network performance metric of the plurality of network performance measurements. In some examples, router 110A may apply different weights to different network performance measurements based on a type of a service associated with the session between client device 100 and service instance 104, such that the determined cost is specific to the particular type of service. For example, where the service is a video streaming service, router 110A may weigh packet loss as having more importance and a latency as having less importance. As another example, where the service is a video streaming service, router 110A may weigh packet loss as having more importance and a latency as having less importance. As another example, where the service is a remote desktop service, router 110A may weigh latency as having more importance and a bandwidth as having less importance. Router 110A may compute, based on the cost of each link forming the multi-hop path, a path cost for the multi-hop path.

Router 110A may determine which of the multi-hop paths complies with requirements (e.g., SLA requirements) for a particular service associated with a session between client device 100 and a service instance, e.g., service instance 104A or service instance 104B. For example, router 110A may compare a path performance metric (e.g., or MOS) of each multi-hop path with an SLA for a service associated with session 40 between client device 100 and service instance 104A. In this example, SLA requirements for the service associated with service instance 104A specify a path latency of less than 30 ms for packets exchanged between client device 100 and service instance 104A. If the first multi-hop path for session 40 does not comply with the SLA requirements for service instance 104A (e.g., sum of each link of the multi-hop path does not provide a path latency of less than 30 ms) but a second multi-hop path for session 40 complies with the SLA requirements for the service, router 110A may select the second multi-hop path to forward network traffic for session 40 (represented in FIG. 1 as session 40') to service instance 104A.

In some examples, if the path performance metric of the first multi-hop path and the path performance metric of the second multi-hop path both comply with the SLA requirements for the service associated with service instance 104A (e.g., by providing a path latency of less than 30 ms), router 110A may further determine which of the multi-hop paths is more suitable for transporting traffic for the session between client device 100 and service instance 104A. In some examples, router 110A may select the multi-hop path that provides better end-to-end performance. For example, router 110A may apply a path computation algorithm (e.g., shortest path first (SPF)) with the path performance metric as a cost to select the path with the best performance (e.g., lowest path latency, the least amount of packet loss over the path, the highest bandwidth path, etc.).

In response to determining which of the multi-hop paths has better performance, router 110A may forward traffic to service instance 104A along the selected path for session 40'. In some examples, router 110A may configure a forwarding state (e.g., a next hop to router 110B) to forward traffic along the selected multi-hop path to forward traffic to service instance 104A. Each of the routers along the selected path for session 40', e.g., routers 110B and router 110D, may also configure a forwarding state to forward traffic along the selected multi-hop path to forward traffic to service instance 104A. In some examples, router 110A may modify a packet to include metadata including a list of routers of the second multi-hop path (e.g., routers 110B, 110D, and 110E) such that the successive routers may forward the traffic along the second multi-hop path to service instance 104A.

The path selection as described herein does not disrupt the path for other service instances, e.g., service instance 104B. In this example, router 110A may determine that the end-to-end performance of a multi-hop path for which to send traffic to service instance 104A does not (or no longer) comply with SLA requirements for service instance 104A and the end-to-end performance of a multi-hop path for which to send traffic to service instance 104B complies with SLA requirements for service instance 104B. Router 110A may perform service-specific path failover such that traffic for service instance 104A is switched to a different multi-hop path to service instance 104A while the multi-hop path for forwarding traffic to service instance 104B is maintained.

Figure 2:
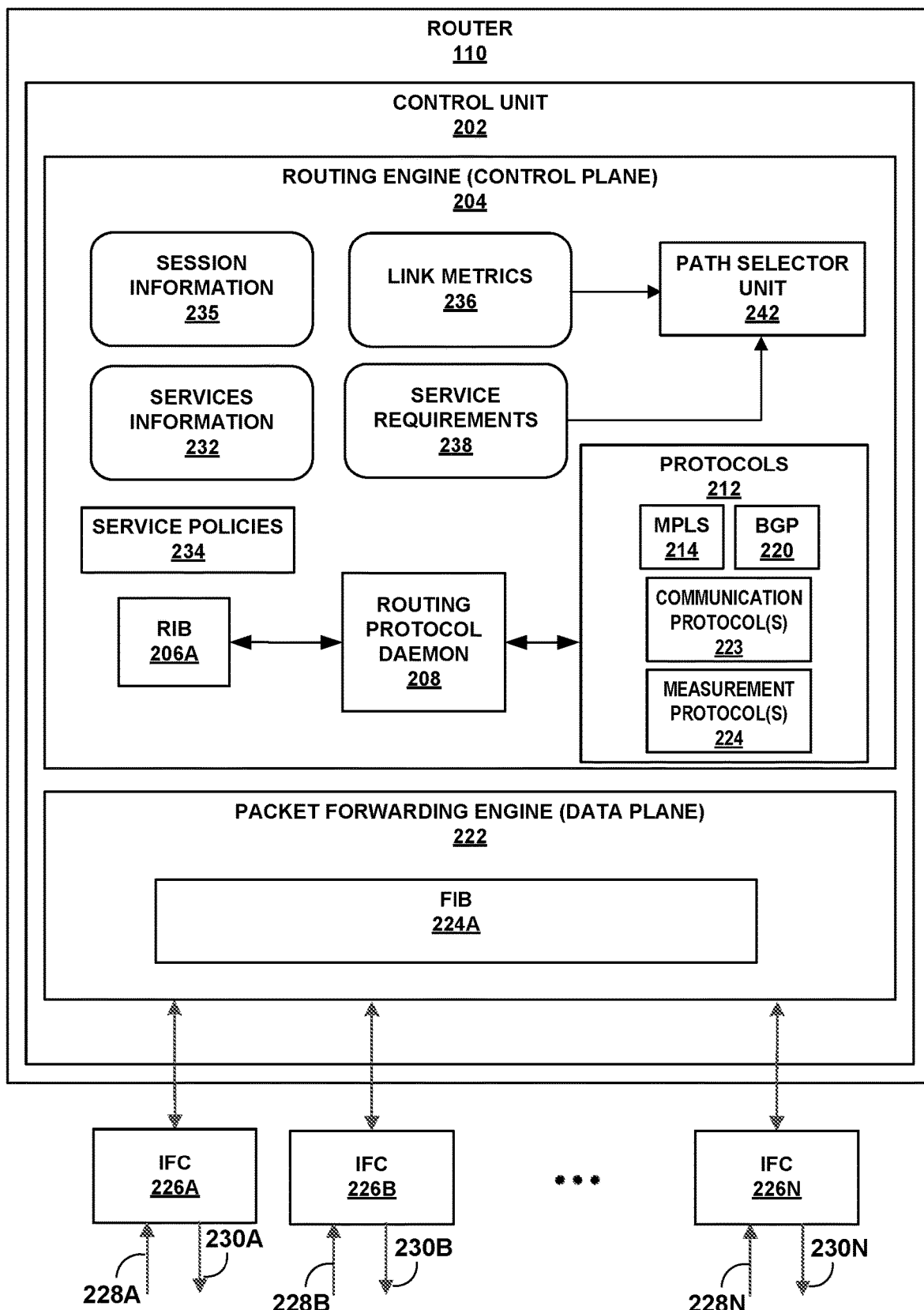
FIG. 2 is a block diagram illustrating an example router in accordance with the techniques of the disclosure.

FIG. 2 is a block diagram illustrating example router 110 in accordance with the techniques of the disclosure. In general, router 110 may be an example implementation of one of routers 110 of FIG. 1. In this example, router 110 includes interface cards 226A-226N ("IFCs 226") that receive packets via incoming links 228A-228N ("incoming links 228") and send packets via outgoing links 230A-230N ("outgoing links 230"). Incoming links 228 and/or outgoing links 230 may represent links 16 of FIG. 1. IFCs 226 are typically coupled to links 228, 230 via a number of interface ports. Router 110 also includes a control unit 202 that determines routes of received packets and forwards the packets accordingly via IFCs 226.

Control unit 202 may comprise routing engine 204 and packet forwarding engine 222. Routing engine 204 operates as the control plane for router 110 and includes an operating system that provides a multi-tasking operating environment for execution of a number of concurrent processes. Routing engine 204 communicates with other routers, e.g., such as routers 110 of FIG. 1, to establish and maintain a computer network, such as computer network system 2 of FIG. 1, for transporting network traffic between one or more customer devices.

Routing protocol daemon (RPD) 208 of routing engine 204 executes software instructions to implement one or more control plane networking protocols 212. For example, protocols 212 may include one or more routing protocols, such as Border Gateway Protocol (BGP) 220, for exchanging routing information with other routing devices and for updating routing information base (RIB) 206, Protocols 212 may include one or more Multiprotocol Label Switching (MPLS) protocols 214, such as Label Distribution Protocol (LDP) or Resource Reservation Protocol with Traffic Engineering extensions (RSVP-TE), to enable router 110 to use labels to forward network traffic. Protocols 212 may further include one or more communication protocols, such as TCP, UDP, TLS, or ICMP, to establish one or more sessions. Protocols 212 may also include one or more measurement protocols 224, such as OWAMP, TWAMP, ICMP, ping (e.g., TCP/ICMP), or other protocols to measure network performance metrics such as latency, jitter, packet loss, etc.

RIB 206 may describe a topology of the computer network in which router 110 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. Session information 235 may comprise a table, list, or other data structure. For example, session information 235 comprises one or more entries that specify a session identifier for a session (e.g., session 40 of 42 of FIG. 1). In some examples, the session identifier comprises one or more of a source address, source port, destination address, destination port, or protocol associated with a forward flow and/or a reverse flow of the session. As described above, when routing engine 204 receives a packet for a forward packet flow originating from client device 100 and destined for server 103A of FIG. 1, routing engine 204 determines whether the packet belongs to a new session (e.g., is the "first" packet or "lead" packet of session 40). To determine whether the packet belongs to a new session, routing engine 204 determines whether session information 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session information 235. Routing engine 204 may thereafter use the session identifier stored in session information 235 to identify whether subsequent packets belong to the same session.

Services information 232 stores information that routing engine 204 may use to identify a service associated with a session. Services information 232 may comprise a table, list, or other data structure. For example, services information 232 comprises one or more entries that specify a service identifier and one or more of a source address, source port, destination address, destination port, or protocol associated the service. In some examples, routing engine 204 may perform a lookup of services information 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services information 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

In accordance with the techniques of the disclosure, routing engine 204 includes path selector unit 242 to perform metric-based multi-hop path selection. In some examples, routing engine 204 may instruct path selector unit 242 to perform metric-based multi-hop path selection when selecting a path for a new session. In some examples, a path failover policy in service policies 234 may invoke path selector unit 242 to perform metric-based multi-hop path failover.

In the example of FIG. 2, RPD 208 executes software instructions to implement one or more measurement protocols 224 to measure one or more network performance metrics of links 228, 230 of router 110 to adjacent routers and/or client devices. In some examples, routers 110 may perform in-line performance monitoring, as described above, to measure one or more network performance metrics of outgoing links 230. Routing engine 204 may store the locally measured network performance metrics of links 228, 230 in a local data storage (e.g., link metrics 236) and/or sent to a centralized repository (e.g., server 112 of FIG. 1). In some examples, routing engine 204 may send a JSON document including the locally measured network performance metrics to server 112. Routing engine 204 may also receive network performance metrics of links locally measured by other routers 110. For example, routing engine 204 may receive one or more JSON documents from server 112 specifying network performance metrics measured by the other routers and stores the network performance metrics in link metrics 236.

Path selector unit 242 may use the network performance metrics to determine an end-to-end performance of each multi-hop path to send traffic to a particular service. In some examples, path selector unit 242 may compute a path performance metric (e.g., latency or bandwidth) for a multi-hop path to a particular service (e.g., service instance 104A of FIG. 1). Alternatively, or additionally, path selector unit 242 may receive an indication of an individual link failure of a plurality of links that interconnect a plurality of routers that form a multi-hop path to the service instance. In some examples, path selector unit 242 may compute a mean opinion score (MOS) (e.g., rating value indicating a particular quality ranging from excellent, good, fair, poor, and bad) based on the network performance metrics of each link of a multi-hop path.

Path selector unit 242 may compare a path performance metric (e.g., or MOS) of each multi-hop path with an SLA for a service associated with a session between a client device and the service instance. If a first multi-hop path does not comply with the SLA requirements for the service but a second multi-hop path does comply with the SLA requirements for the service, path selector unit 242 may select the second multi-hop path to forward network traffic for the session (e.g., session 40' of FIG. 1) to forward traffic to a service instance providing the service. In some examples, if the path performance metric of a first multi-hop path and the path performance metric of a second multi-hop path both comply with the SLA requirements for the service, router 110A may further determine which of the multi-hop paths is more suitable for transporting traffic for the session associated with the service. In some examples, router 110A selects the multi-hop path that provides better performance. For example, path selector unit 242 may apply a path computation algorithm (e.g., shortest path first (SPF) via Dijkstra's algorithm), with the network performance metrics of each link and/or path performance metrics of the multi-hop path as a cost, to select the multi-hop path with the best end-to-end performance (e.g., lowest path latency, the least amount of packet loss over the path, the highest bandwidth path, etc.). In some examples, path selector unit 242 may select the multi-hop path with a minimum variable performance. In these examples, path selector unit 242 may select the multi-hop path that may least comply with the SLA requirement such that customers may use path with the minimal variable performance to reduce costs.

In response to determining which of the multi-hop paths has better performance, path selector unit 242 may instruct routing engine 204 to generate forwarding information for forwarding engine 222, stored in FIB 224, such as configuring the network destination (e.g., service instance 104A) with specific next hops of the second multi-hop path and corresponding IFC 226 and physical output port for output link 230 to a next hop router of the second multi-hop path. In some examples, routing engine 204 may configure forwarding engine 222 to modify a packet to include metadata including a list of routers of the second multi-hop path (e.g., routers 110B, 110D, and 110E of FIG. 1) such that the successive routers may forward the traffic along the second multi-hop path to the service instance.

Figure 3A:
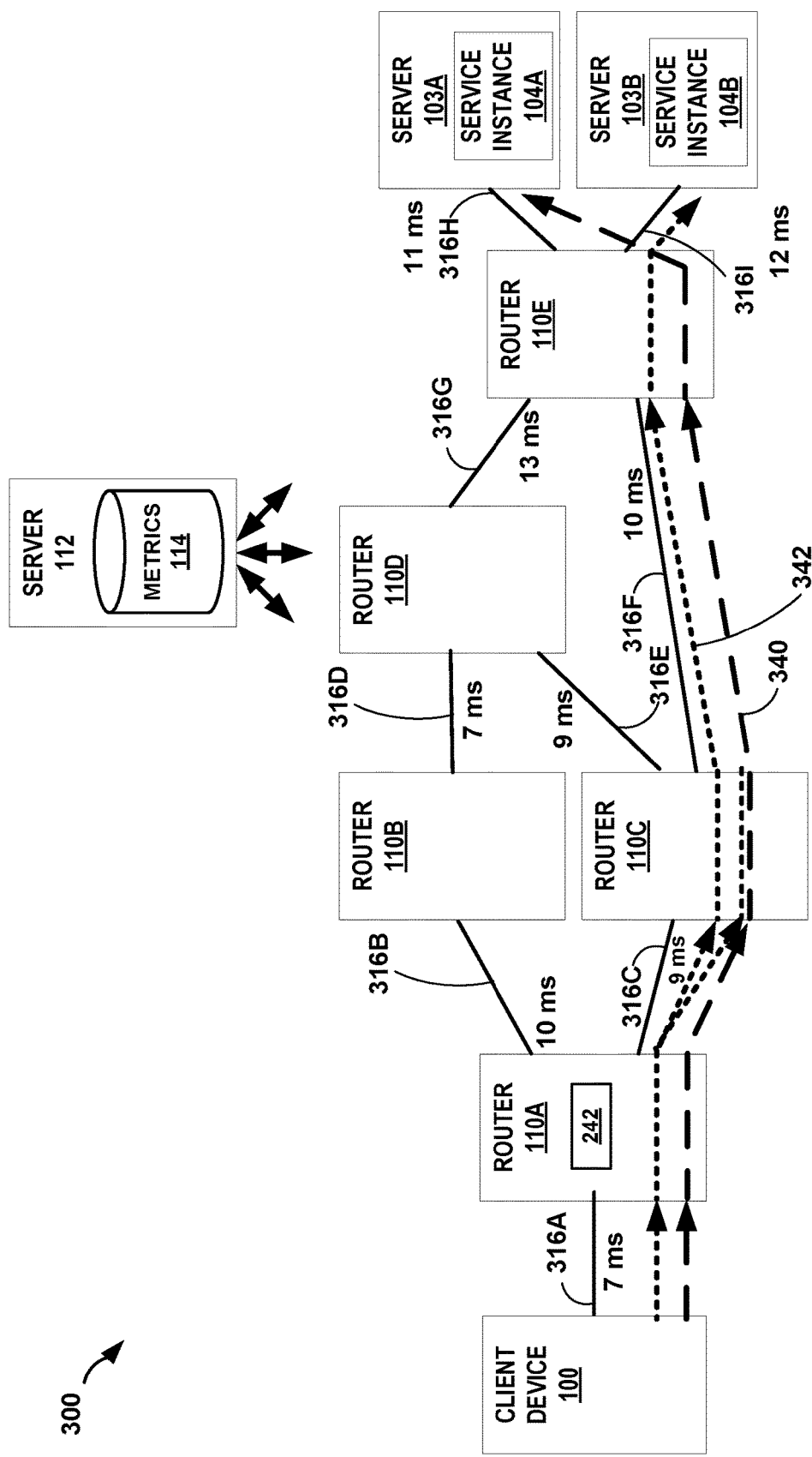
FIGS. 3A and 3B are block diagrams illustrating an example computer network system that performs metric-based path selection based on one or more network performance metrics of each of a plurality of links, in accordance with the techniques of the disclosure.
Figure 3B:
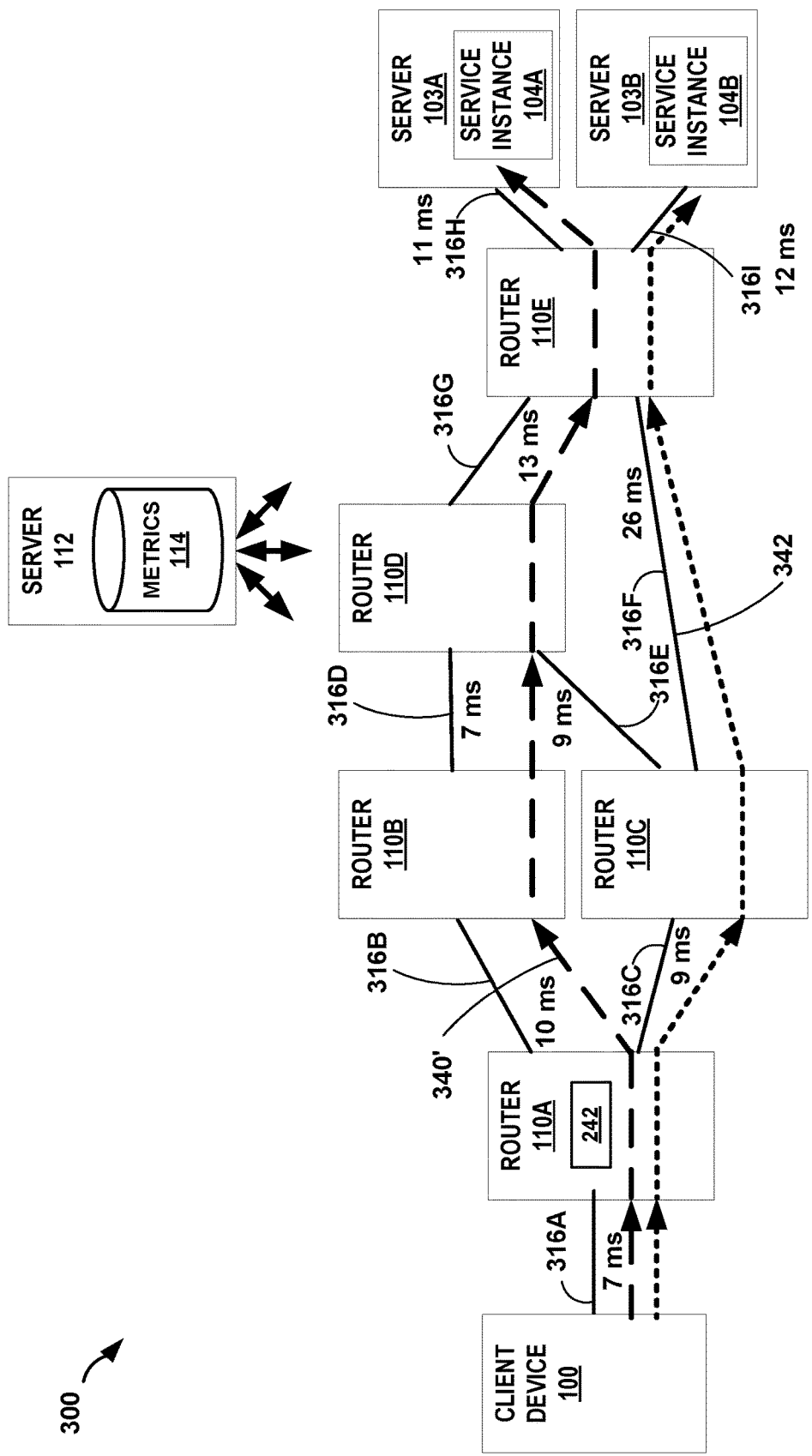

FIGS. 3A and 3B are block diagrams illustrating an example computer network system 300 that performs metric-based path selection based on one or more network performance metrics of each a plurality of links 316A-316H (collectively, "links 316"), in accordance with the techniques of the disclosure. System 300 may be an example implementation of system 2 of FIG. 1. Routers 110A-110E of FIGS. 3A and 3B may be examples of routers 110A-110E of FIG. 1 or router 110 of FIG. 2.

In the example of FIG. 3A, server 103A hosts service instance 104A, which instantiates a first network service (e.g., web application or service). Server 103B hosts service instance 104B, which instantiates a second network service (e.g., audio/video service). In this example, client device 100 establishes session 340 to service instance 104A and establishes session 342 to service instance 104B. A forward flow for session 340 includes a multi-hop path including client device 100, router 110A, router 110C, router 110E, and server 103A interconnected by links 316A, 316C, 316F, and link 316H, respectively. A forward flow for session 342 includes a multi-hop path including client device 100, router 110A, router 110C, router 110E, and server 103B interconnected by links 316A, link 316C, 316F, and link 316I, respectively Assume for example a latency of the multi-hop path to service instance 104A currently complies with an SLA for the service provided by service instance 104A (e.g., a path latency of less than 50 ms), and a latency of the multi-hop path to service instance 104B currently complies with an SLA for the service provided by service instance 104B (e.g., a path latency of less than 60 ms). In the example of FIG. 3A, one or more links may experience a change in latency that may affect the end-to-end performance of the multi-hop paths. For example, a link (e.g., link 316F) of the multi-hop path may experience an increase in latency or fail, therefore causing the current multi-hop path to service instance 104A to no longer comply with the SLA for the service provided by service instance 104A.

In accordance with the techniques described in this disclosure, router 110A receives network performance metrics of each link of the multi-hop paths to perform metric-based multi-hop path selection, as shown in FIG. 3B. In the example of FIG. 3B, each of routers 110 may implement a measurement protocol or perform in-line performance monitoring to measure one or more network performance metrics of its immediate links to other routers and/or endpoints. In this example, router 110A may measure the latency of link 316A (e.g., 7 ms), link 316B (e.g., 10 ms), and link 316C (e.g., 9 ms). Router 110B may measure the latency of link 316B (e.g., 10 ms) and link 316D (e.g., 7 ms). Router 110C may measure the latency of link 316C (e.g., 9 ms), link 316E (e.g., 9 ms), and 316F (e.g., 26 ms). Router 110D may measure the latency of link 316D (e.g., 7 ms), link 316E (e.g., 9 ms), and link 316G (e.g., 13 ms). Router 110E may measure the latency of links 316F (e.g., 26 ms), link 316G (e.g., 13 ms), link 316H (e.g., 11 ms), and 316I (e.g., 12 ms). Each of routers 110 may send the measured network performance metrics to server 112, which stores the latency measurements of links 316 in a data store (e.g., metrics 114).

Router 110A receives the latency measurements from server 112 and determines an end-to-end latency performance of each multi-hop path to the service instance. For example, router 110A may compute an path latency of 53 ms for the multi-hop path traversing links 316A, 316C, 316F, and link 316H to service instance 104A and a path latency of 54 ms for the multi-hop path traversing links 316A, 316C, 316F, and link 316I to service instance 104B. Router 110A may, in this example, determine the multi-hop path to service instance 104A traversing links 316A, 316C, 316F, and link 316H no longer complies with the SLA for service instance 104A (e.g., latency of less than 50 ms), and the multi-hop path to service instance 104B traversing links 316A, 316C, 316F, and link 316I still complies with the SLA for service instance 104B (e.g., latency of less than 60 ms).

In response, router 110A may failover to another path that complies with the SLA for service instance 104A and/or has the best end-to-end latency. For example, router 110A may compute a path latency of 48 ms for the multi-hop path to service instance 104A traversing links 316A, 316B, 316D, link 316G, and link 316H. Router 110A may also compute a path latency of 49 ms for the multi-hop path traversing links 316A, 316C, 316E, 316G, and 316H to service instance 104A.

Path selector unit 242 of router 110A may select a suitable path over which to forward traffic to the service instance based on service-specific SLA requirements and the metrics of each link of the multi-hop paths. In one example, path selector unit 242 of router 110A selects a path having a best path performance metric. In this example, the multi-hop path to service instance 104A traversing links 316A, 316B, 316D, link 316G, and link 316H, and the multi-hop path to service instance 104A traversing links 316A, 316C, 316E, 316G, and 316H both comply with the SLA for service instance 104A. Path selector unit 242 of router 110A may apply, for example, a Dijkstra's algorithm to determine the best path based on the end-to-end latency of each multi-hop path. In this example, because the end-to-end latency is the lowest latency among the other multi-hop paths to service instance 104A, path selector unit 242 selects the multi-hop path traversing links 316A, 316B, 316D, link 316G, and link 316H over which to forward network traffic for session 340 (represented in FIG. 3 as session 340') to service instance 104A.

In some examples, router 110A may select a path with a minimum variable performance. In this example, router 110A may select the multi-hop path traversing links 316A, 316C, 316E, 316G, and 316H to service instance 104A because the path latency (e.g., 49 ms) for the multi-hop path least complies with the SLA requirement for the service provided by service instance 104A and may have a lower cost than other multi-hop paths (e.g., multi-hop path traversing links 316A, 316B, 316D, link 316G, and link 316H). The path with the minimum variable performance may, in some examples, provide a more cost-effective path option for the customer.

Path selector unit 242 may cause the routing engine of router 110A to configure the forwarding engine of router 110A to forward traffic for service instance 104A along the selected multi-hop path. As one example, router 110A may, in response to receiving traffic for service instance 104A, send a packet associated with session 340' including metadata specifying a session identifier for session 340' and a list of routers of the second multi-hop path (e.g., routers 110B, 110D, and 110E) such that the successive routers may forward the traffic along the second multi-hop path to service instance 104A.

Figure 4:
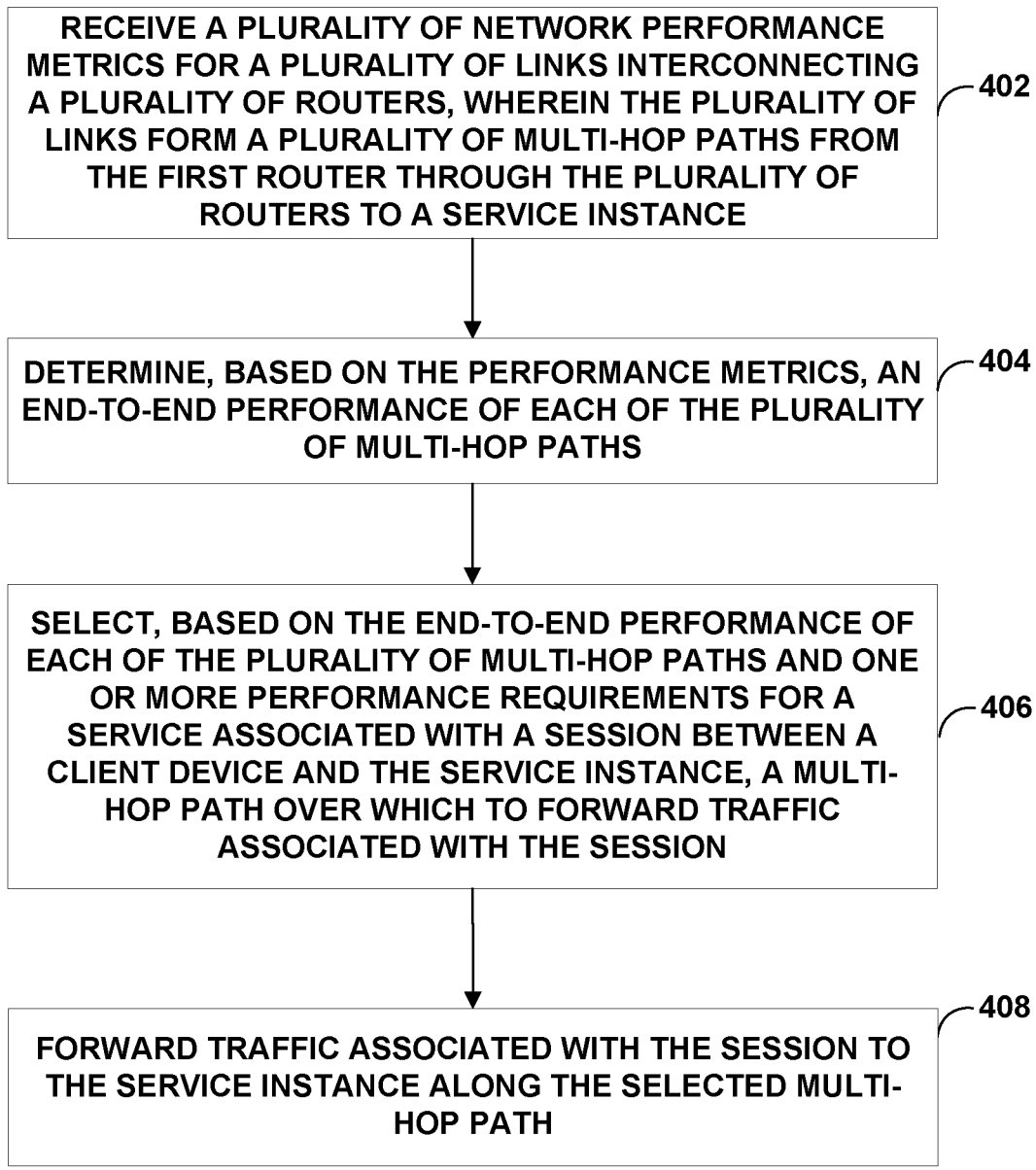
FIG. 4 is a flowchart illustrating an example operation in accordance with the techniques of the disclosure.

FIG. 4 is a flowchart illustrating an example operation in accordance with the techniques of the disclosure. Specifically, FIG. 4 depicts an example for performing metric-based multi-hop path selection. FIG. 4 is described with respect to router 110A of FIGS. 1, 2, and 3A-3B for convenience. The operation depicted in FIG. 4 may additionally, or alternatively, be implemented by any of routers 110.

In the example of FIG. 4, router 110A receives a plurality of network performance metrics for a plurality of links (e.g., links 16) interconnecting a plurality of routers (e.g., routers 110), wherein the plurality of links form a plurality of multi-hop paths from router 110A through the plurality of routers to a service instance (e.g., service instance 104A) (402). For example, each of routers 110 may implement measurement protocols or perform in-line performance monitoring to measure one or more network performance metrics of immediate links to adjacent routers and/or endpoints (e.g., client devices). Each of routers 110 may send the measured network performance metrics to a centralized repository, e.g., server 112, from which router 110A may receive the network performance metrics.

Router 110A determines, based on the plurality of network performance metrics, an end-to-end performance for each of the plurality of multi-hop paths (404). For example, router 110A computes a path performance metric (e.g., latency, bandwidth, packet loss, etc.) for each of the multi-hop paths. Alternatively, or additionally, router 110A may receive an indication of an individual link failure among the plurality of links of a multi-hop path. In some examples, router 110A may compute a mean opinion score (MOS) (e.g., rating value indicating a particular quality ranging from excellent, good, fair, poor, and bad) based on the network performance metrics of each link 16 of a multi-hop path.

Router 110A selects, based on the end-to-end performance of each of the plurality of multi-hop paths and one or more performance requirements (e.g., SLA requirements) for the service associated with a session between a client device and a service instance (e.g., session 40 between client device 100 and service instance 104A), a multi-hop path over which to forward traffic associated with the session (406). Router 110A may compare a path performance metric (e.g., or MOS) of each multi-hop path with an SLA for the service provided by the service instance. If a first multi-hop path does not comply with the SLA requirements for the service and a second multi-hop path complies with the SLA requirements for the service, router 110A may select the second multi-hop path to forward network traffic for the session (e.g., session 40' of FIG. 1) to forward traffic to the service instance. If more than one multi-hop path complies with the SLA requirements for the service instance, router 110A may apply a path computation algorithm (e.g., SPF via Dijkstra's algorithm), with the network performance metrics of each link of the multi-hop path as a cost, to select the multi-hop path with the best end-to-end performance. In some examples, router 110A may select the path with a minimum variable performance (e.g., least complies with the SLA requirements for the service).

Router 110A forwards the traffic associated with the session to the service instance along the selected multi-hop path (408). For example, router 110A may configure a forwarding state (e.g., a next hop to router 110B) to forward traffic along the selected multi-hop path to forward traffic to service instance 104A. Each of the routers along the selected path for session 40', e.g., routers 110B and router 110D, may also configure a forwarding state to forward traffic along the selected multi-hop path to forward traffic to service instance 104A. In some examples, router 110A may modify a packet to include metadata including a list of routers of selected multi-hop path (e.g., routers 110B, 110D, and 110E) such that the successive routers may forward the traffic along the second multi-hop path to service instance 104A.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
receiving, by a first router of a plurality of routers and from a server, metrics of individual links forming a plurality of paths associated with a service, wherein the server is configured to store the metrics of individual links, the metrics of individual links received from each router of the plurality of routers;
selecting, by the first router and based on the metrics of the individual links forming the plurality of paths associated with the service, a path of the plurality of paths associated with the service, wherein the path satisfies a performance requirement of the service and one or more of the individual links forming the path do not satisfy the performance requirement of the service; and
in response to selecting the path of the plurality of paths associated with the service, forwarding, by the first router, network traffic associated with a session between a source client device and a destination client device providing the service on the selected path, wherein the network traffic includes at least one packet that is modified to include metadata specifying addressing information for the source client device and the destination client device.

2. The method of claim 1, wherein receiving the metrics of individual links forming the plurality of paths associated with the service comprises:
receiving, from the server, a JavaScript Object Notation (JSON) document comprising the metrics of individual links forming the plurality of paths associated with the service.

3. The method of claim 1, wherein selecting, based on the metrics of the individual links forming the plurality of paths associated with the service and one or more network performance metrics for the service, the path of the plurality of paths associated with the service comprises:
applying, by the first router, the metrics of the individual links forming the plurality of paths associated with the service as a cost to a shortest path first calculation.

4. A method comprising:
receiving, by a first router of a plurality of routers of a network connecting a client device to a service instance, a plurality of network performance metrics for a plurality of links interconnecting the plurality of routers, wherein the plurality of links form a plurality of multi-hop paths from the first router through the plurality of routers to the service instance;
determining, by the first router and based on the plurality of network performance metrics, an end-to-end performance of each of the plurality of multi-hop paths;
selecting, by the first router and based on determining that the end-to-end performance of a corresponding multi-hop path of the plurality of multi-hop paths satisfies a performance requirement for the service instance and, a multi-hop path over which to forward traffic associated with a session, wherein one or more links of the corresponding multi-hop path do not satisfy the performance requirement for the service instance; and
forwarding, by the first router, the traffic associated with the session to the service instance along the selected multi-hop path.

5. The method of claim 4, wherein receiving the plurality of network performance metrics for the plurality of links interconnecting the plurality of routers comprises:

receiving, from a server, the plurality of network performance metrics, wherein the server is configured to store the plurality of network performance metrics received from each of the plurality of routers.

6. The method of claim 4, wherein determining the end-to-end performance of each of the plurality of multi-hop paths comprises:

computing, based on the plurality of network performance metrics, a path performance metric for each of the plurality of multi-hop paths.

7. The method of claim 6, wherein the path performance metric for each of the plurality of multi-hop paths comprises at least one of a latency of the multi-hop path, a jitter of the multi-hop path, a packet loss of the multi-hop path, or a bandwidth of the multi-hop path.

8. The method of claim 4, wherein determining the end-to-end performance of each of the plurality of multi-hop paths comprises:

computing, based on the plurality of network performance metrics, a mean opinion score (MOS) for each of the plurality of multi-hop paths.

9. The method of claim 4, wherein the plurality of network performance metrics further comprises:

one or more network performance metrics for one or more first links interconnecting a first edge router of the plurality of routers and the client device; and one or more network performance metrics for one or more second links interconnecting a second edge router of the plurality of routers and the service instance.

10. The method of claim 4, wherein the selected multi-hop path comprises a first multi-hop path, the method further comprising:

receiving, by the first router, a plurality of updated network performance metrics for the plurality of links interconnecting the plurality of routers;

determining, by the first router and based on the plurality of updated network performance metrics, an updated end-to-end performance of each of the plurality of multi-hop paths;

determining, by the first router and based on the updated end-to-end performance of the first multi-hop path, that the first multi-hop path no longer complies with the one or more performance requirements for the service associated with the session;

selecting, by the first router and based on the updated end-to-end performance of each of the plurality of multi-hop paths and the one or more performance requirements for the service associated with the session, a second multi-hop path over which to forward the traffic associated with the session, wherein the second multi-hop path complies with the one or more performance requirements for the service associated with the session; and forwarding, by the first router, the traffic associated with the session to the service instance along the second multi-hop path.

11. The method of claim 4, further comprising:

determining, by the first router, at least two of the plurality of multi-hop paths that comply with the one or more performance requirements for the service associated with the session, wherein selecting the multi-hop path over which to forward the traffic comprises selecting the multi-hop path that best satisfies the one or more performance requirements for the session from among the at least two of the plurality of multi-hop paths.

12. The method of claim 4, further comprising:

determining, by the first router, at least two of the plurality of multi-hop paths that comply with the one or more performance requirements for the service associated with the session, wherein selecting the multi-hop path over which to forward the traffic comprises selecting the multi-hop path that least satisfies the one or more performance requirements for the session from among the at least two of the plurality of multi-hop paths.

13. The method of claim 4, wherein selecting the multi-hop path over which to forward the traffic comprises:

applying, by the first router, the plurality of network performance metrics for the plurality of links interconnecting the plurality of routers as a cost to a shortest path first calculation.

14. A first router of a plurality of routers of a network connecting a client device to a service instance, the first router comprising:

processing circuitry; and a memory operably coupled to the processing circuitry and comprising instructions configured to cause the processing circuitry to:

receive a plurality of network performance metrics for a plurality of links interconnecting the plurality of routers, wherein the plurality of links form a plurality of multi-hop paths from the first router through the plurality of routers to the service instance;

determine, based on the plurality of network performance metrics, an end-to-end performance of each of the plurality of multi-hop paths;

select, based on determining that the end-to-end performance of a corresponding multi-hop path of the plurality of multi-hop paths satisfies a performance requirement for the service instance, a multi-hop path over which to forward traffic associated with a session, wherein one or more links of the corresponding multi-hop path do not satisfy the performance requirement for the service instance; and forward the traffic associated with a session to the service instance along the selected multi-hop path.

15. The router of claim 14, wherein to receive the plurality of network performance metrics for the plurality of links interconnecting the plurality of routers, the processing circuitry is further configured to:

receive, from a server, the plurality of network performance metrics, wherein the server stores the plurality of network performance metrics measured by each of the plurality of routers.

16. The router of claim 14, wherein to determine the end-to-end performance of each of the plurality of multi-hop paths, the processing circuitry is further configured to:

compute, based on the plurality of network performance metrics, a path performance metric for each of the plurality of multi-hop paths.

17. The router of claim 14, wherein the path performance metric for each of the plurality of multi-hop paths comprises at least one of a latency of the multi-hop path, a jitter of the multi-hop path, a packet loss of the multi-hop path, or a bandwidth of the multi-hop path.

18. The first router of claim 14, wherein the selected multi-hop path comprises a first multi-hop path, the processing circuitry is further configured to:

receive a plurality of updated network performance metrics for the plurality of links interconnecting the plurality of routers;

determine, based on the plurality of updated network performance metrics, an updated end-to-end performance of each of the plurality of multi-hop paths;

determine, based on the updated end-to-end performance of the first multi-hop path, that the first multi-hop path no longer complies with the one or more performance requirements for the service associated with the session to the service instance;

select, based on the updated end-to-end performance of each of the plurality of multi-hop paths and the one or more performance requirements for the service associated with the session to the service instance, a second multi-hop path over which to forward the traffic associated with the session, wherein the second multi-hop path complies with the one or more performance requirements for the service instance; and forward traffic to the service instance along the second multi-hop path.

19. The first router of claim 14, wherein the processing circuitry is further configured to:

determine at least two of the plurality of multi-hop paths that comply with the one or more performance requirements for the service associated with the session, wherein to select the multi-hop path over which to forward the traffic, the processing circuitry is further configured to select the multi-hop path that best satisfies the one or more performance requirements for the session from among the at least two of the plurality of multi-hop paths.

20. The first router of claim 14, wherein to select the multi-hop path over which to forward the traffic, the processing circuitry is further configured to:

apply the plurality of network performance metrics for the plurality of links interconnecting the plurality of routers as a cost to a shortest path first calculation.

* * * * *